(12) United States Patent
Green

(10) Patent No.: US 10,326,276 B2
(45) Date of Patent: Jun. 18, 2019

(54) ELECTRICAL POWER SYSTEMS INCORPORATING THERMAL ENERGY STORAGE

(71) Applicant: SOLARRESERVE TECHNOLOGY, LLC, Santa Monica, CA (US)

(72) Inventor: Adam Green, Los Angeles, CA (US)

(73) Assignee: SOLARRESERVE TECHNOLOGY, LLC, Santa Monica, CA (US)

( * ) Notice: Subject to any disclaimer, the term of this patent is extended or adjusted under 35 U.S.C. 154(b) by 0 days.

(21) Appl. No.: 15/564,628

(22) PCT Filed: Apr. 5, 2016

(86) PCT No.: PCT/US2016/025993
§ 371 (c)(1),
(2) Date: Oct. 5, 2017

(87) PCT Pub. No.: WO2016/164341
PCT Pub. Date: Oct. 13, 2016

(65) Prior Publication Data
US 2018/0083449 A1 Mar. 22, 2018

Related U.S. Application Data

(60) Provisional application No. 62/143,544, filed on Apr. 6, 2015.

(51) Int. Cl.
*H02J 3/38* (2006.01)
*F03G 6/00* (2006.01)
(Continued)

(52) U.S. Cl.
CPC ............... *H02J 3/38* (2013.01); *F01K 3/00* (2013.01); *F01K 3/186* (2013.01); *F02C 1/05* (2013.01);
(Continued)

(58) Field of Classification Search
CPC .......... F01K 13/006; F01K 3/00; F01K 3/186; H02J 3/38; H02J 3/28; H02J 15/00;
(Continued)

(56) References Cited

U.S. PATENT DOCUMENTS 4,055,948 A 11/1977 Kraus et al.
4,205,656 A 6/1980 Scarlata
(Continued)

FOREIGN PATENT DOCUMENTS

CH 648412 A5 3/1985
EP 2715298 A2 4/2014
(Continued)

OTHER PUBLICATIONS

Matthew L. Wald, Energy & Environment, The New York Times, "Ice or Molten Salt, Not Batteries, to Store Energy", http://www.nytimes.com/2014/04/22/business/energy-environment/ice-or-molten-salt-not-batteries-to-store-energy.html?_r=0, Apr. 21, 2014, pp. 1-4 (A version appears in print Apr. 22, 2014, on p. F7 of the New York edition).
(Continued)

*Primary Examiner* — Robert L Deberadinis

(57) ABSTRACT

The present invention provides a thermal storage system that is easily integrated with a wide range of electric power systems. In particular, the principles of the present invention are easily implemented at a very large scale to integrate with larger scale grid systems. The thermal storage aspects of the present invention are cost effective to implement. Also, the manner in which the systems operate allow thinner, less expensive wiring to be used effectively. Because heavy wiring can be a significant part of startup expenses, the ability to use thinner gauge wiring provides significant cost savings. Further, the systems are quickly responsive to grid conditions and not only modulate energy storage but also
(Continued)

modulate energy storage fast enough to respond to grid conditions in real time.

23 Claims, 12 Drawing Sheets

(51) Int. Cl.

| | |
|---|---|
| F02C 1/05 | (2006.01) |
| F28D 20/02 | (2006.01) |
| F24S 20/20 | (2018.01) |
| F28D 20/00 | (2006.01) |
| F24S 10/00 | (2018.01) |
| F24S 60/00 | (2018.01) |
| F01K 3/00 | (2006.01) |
| H02J 3/28 | (2006.01) |
| H02J 15/00 | (2006.01) |
| G05D 23/19 | (2006.01) |
| F01K 3/18 | (2006.01) |
| F01K 13/00 | (2006.01) |

(52) U.S. Cl.
CPC ............... *F03G 6/00* (2013.01); *F24S 10/00* (2018.05); *F24S 20/20* (2018.05); *F24S 60/00* (2018.05); *F28D 20/0034* (2013.01); *F28D 20/02* (2013.01); *G05D 23/1923* (2013.01); *H02J 3/28* (2013.01); *H02J 3/383* (2013.01); *H02J 15/00* (2013.01); *F01K 13/006* (2013.01); *F05D 2260/42* (2013.01); *F28D 2020/0047* (2013.01); *Y02E 10/46* (2013.01); *Y02E 60/142* (2013.01); *Y02E 60/145* (2013.01)

(58) Field of Classification Search
CPC .... H02J 3/383; F03G 6/00; F02C 1/05; F28D 20/02; F28D 20/0034; F28D 2020/047; F05D 2260/42; Y02E 10/46; Y02E 60/145; F24S 20/20; F24S 10/00; F24S 60/00; G05D 23/1923

See application file for complete search history.

(56) References Cited

U.S. PATENT DOCUMENTS

| | | | |
|---|---|---|---|
| 4,248,291 A | 2/1981 | Jarmul | |
| 4,394,814 A | 7/1983 | Wardman et al. | |
| 4,438,630 A | 3/1984 | Rowe | |
| 5,384,489 A | 1/1995 | Bellac | |
| 6,494,042 B2 | 12/2002 | Bronicki | |
| 6,701,711 B1 | 3/2004 | Litwin | |
| 6,957,536 B2 | 10/2005 | Litwin et al. | |
| 7,296,410 B2 | 11/2007 | Litwin | |
| 7,340,899 B1 | 3/2008 | Rubak et al. | |
| 8,327,641 B2 | 12/2012 | Freund et al. | |
| 9,816,490 B2 | 11/2017 | Conlon | |
| 2004/0099261 A1 | 5/2004 | Litwin | |
| 2004/0148922 A1 | 8/2004 | Pinkerton | |
| 2005/0126560 A1 | 6/2005 | Litwin | |
| 2006/0179840 A1 | 8/2006 | Murphy et al. | |
| 2007/0157614 A1 | 7/2007 | Goldman | |
| 2008/0000231 A1 | 1/2008 | Litwin et al. | |
| 2009/0211249 A1 | 8/2009 | Wohrer et al. | |
| 2010/0072817 A1 | 3/2010 | Hirst | |
| 2010/0175687 A1 | 7/2010 | Zillmer | |
| 2010/0236239 A1 | 9/2010 | Kroizer et al. | |
| 2010/0300096 A1 | 12/2010 | Gandhi | |
| 2010/0301062 A1 | 12/2010 | Litwin et al. | |
| 2011/0016864 A1 | 1/2011 | Wright et al. | |
| 2011/0083443 A1 | 4/2011 | Jockenhoevel et al. | |
| 2011/0147360 A1 | 6/2011 | Hammerstrom | |
| 2012/0241122 A1 | 9/2012 | Xiang et al. | |
| 2013/0049368 A1 | 2/2013 | Kaufmann et al. | |
| 2013/0056169 A1 | 3/2013 | Stiesdal et al. | |
| 2013/0081394 A1 | 4/2013 | Perry | |
| 2013/0292084 A1 | 11/2013 | Luz et al. | |
| 2014/0182576 A1 | 7/2014 | Harats et al. | |
| 2017/0075939 A1 | 3/2017 | Biewald et al. | |

FOREIGN PATENT DOCUMENTS

| | | |
|---|---|---|
| GB | 2514128 A | 11/2014 |
| WO | 2008/105913 A2 | 9/2008 |
| WO | 2012164102 A2 | 12/2012 |
| WO | 2014/052927 A1 | 4/2014 |
| WO | 2014/174373 A2 | 10/2014 |
| WO | 2014/176290 A2 | 10/2014 |

OTHER PUBLICATIONS

Spohie Vorrath, Clean Technica, "Low-Cost Molten Salt Energy Storage Solution Wins Eureka Prize," https://cleantechnica.com/2015/08/28/low-cost-molten-salt-energy-storage-wins-eureka-prize/, Aug. 28, 2015, pp. 1-2. (Originally published on RenewEconomy).

Kevin Bullis, MIT Technology Review, Sustainable Energy, "Molten Salts Might Provide Half-Price Grid Energy Storage", https://www.technologyreview.com/s/525121/molten-salts-might-provide-half-price-grid-energy-storage/, Feb. 27, 2014, pp. 1-3.

ELECTRICAL POWER SYSTEMS INCORPORATING THERMAL ENERGY STORAGE

RELATED APPLICATION

The present non-provisional application claims priority to International Application No. PCT/US2016/025993, filed on Apr. 5, 2016, which in turn claims priority under 35 U.S.C. § 119(e) to U.S. Provisional Application No. 62/143,544, filed on Apr. 6, 2015, wherein these applications are incorporated herein by reference in their entireties for all purposes, respectively.

FIELD OF THE INVENTION

The present invention relates to electrical power systems incorporating thermal energy storage. More particularly, the present invention relates to electrical power systems in which thermal energy is stored in a molten fluid and the rate at which electricity is stored in the molten fluid is controllably modulated responsive to one or more conditions of the electric power system as the molten fluid is heated.

BACKGROUND OF THE INVENTION

An electric power system is a network of electrical components used to supply, transmit and use electric power. An example of an electric power system is the network that supplies a region's homes and businesses with power. For sizable regions, this power system is known as the grid. An electric power system generally includes the generators that supply the power, the transmission system that carries the power from the generating centers to the load centers and the distribution system that feeds the power to nearby homes and industries. Smaller power systems also are found in industry, schools, hospitals, commercial buildings, homes, amusement parks, marine vessels, and the like.

Larger electric power systems also include a grid operator, also known as a transmission system operator or simply as an operator. One function of a grid operator is to manage the security of the power system in real time and to coordinate the supply and demand for electricity. Desirably, the grid operator manages a power system in a manner to avoid undue fluctuations in frequency or interruptions of supply. The grid operator may be an entity that is owned by a transmission grid company or may be fully independent. In some instances, a grid operator is wholly or partly owned by state or national governments. In many cases a grid operator is independent of electricity supplying entities (upstream entities) as well as electricity distribution entities (downstream entities).

The grid operator in many instances works to maintain a continuous (second-by-second) balance between electricity supply from power stations and demand from consumers. The grid operator also may work to ensure the provision of reserves that will allow for safe and timely response to sudden contingencies. The grid operator achieves this by determining an optimal combination of generating stations and reserve providers for each market trading period, instructing generators when and how much electricity to generate, and managing any contingent events that cause the balance between supply and demand to be disrupted. Grid operator staff may undertake this work using sophisticated energy modelling and communications systems.

In some instances, it may be desirable to store electric power for later use. For example, a current availability of electric power supply may be greater than a current demand. If the excess is not stored, it may have to be discarded. In other instances, pricing characteristics of electric power fluctuate. At some times, the price is so low that it is beneficial to store electric power purchased at a low price or even a negative price and then re-supply that power at higher pricing at a subsequent time. In other circumstances, electric consumers may be without power for a period of time due to a power outage. Such outages can be caused by a variety of factors including weather issues and grid problems. In such circumstances, it is desirable to supply stored electric power to users so that their access to electric power is less compromised while grid personnel work to restore the regular power supply.

U.S. Patent Pub. No. 2013/0081394 describes a thermal storage system in which electric energy from an electric power system is thermally stored in molten salt. This innovative thermal storage system is described in context of a solar power system. The solar power is the primary source of thermal energy used to generate electricity. The molten salt is a storage medium used firstly to store electrical energy as thermal energy and secondly to supply thermal energy on demand during periods, such as nighttime or overcast days, when too little solar energy is available.

The thermal storage system proposed by U.S. Patent Pub. No. 2013/0081394 offers great promise as a way to efficiently and cost effectively store electrical energy on a very large scale. However, challenges remain for the system to be constructed more economically. Additionally, the electrical power system that supplies the electrical energy to be stored has characteristics that are constantly changing. A thermal storage system desirably is quickly responsive to these changes when storing electrical energy. A system that responds too slowly might only be able to act in a desired manner only after the conditions leading to a desired action have become obsolete and have been replaced by new conditions that require a different action. A slow system, in other words, is unable to respond to grid changes in a timely fashion.

SUMMARY OF THE INVENTION

The present invention provides a thermal storage system that easily integrates with a wide range of electric power systems. In particular, the principles of the present invention are easily implemented at a very large scale to integrate with larger scale grid resources, such as steam-powered generation plants. The thermal storage aspects of the present invention are cost effective to implement due to the nature of the materials selected and also to the ability to integrate the present invention into conventional power generation infrastructure. For example, the present invention can be incorporated into an existing steam power plant that uses natural gas, sharing the cost and providing another use for equipment such as transformers, steam turbines, cooling systems, water treatment resources, and other balances of plant equipment. The voltage ranges at which the present invention may be selected to operate allow for lower equipment cost through the use of thinner conducting wire, smaller transformers, and other efficiencies.

As one significant advantage, the principles of the present invention may be integrated or retrofit into conventional power plant facilities. By allowing the existing equipment to be used for multiple, compatible roles, the present invention cost effectively allows substantially higher equipment utilization to be achieved. In practical effect, this allows existing steam-powered generation plants to have more capabilities and more energy output per unit of capital investment.

As another advantage, systems incorporating principles of the present invention may be charged to store thermal energy or discharged independently. In some modes of practice, charging and discharging may occur simultaneously, although the rates of charging and discharging may be different if desired. Further, the systems are quickly responsive to grid conditions and not only modulate energy storage and energy discharge, but also independently modulate energy storage and/or discharge fast enough to respond to grid operation demands in real time.

Embodiments of the present invention can be modified in modular fashion. This means that an embodiment can be modified at a later date by adding only certain components to selectively augment capabilities. For example, one modification may involve adding or reducing the number of heaters. Another modification might involve adding or taking away molten fluid from a system. Another modification might involve adding or removing hot and/or cold tank storage units. The modularity allows the system to easily adapt to changing needs during the life of a facility. The modularity also would allow components from one embodiment to be shifted to another embodiment if desired as needs among different embodiments change.

As still yet another significant advantage, integrating principles of the present invention into existing facilities allows those facilities to respond significantly faster to grid information. For example, a typical power generation facility cycles on and off. Cold start up takes time, e.g., 2 to 3 hours. This means that grid operators must take this time lag into account when managing grid resources unless a system is kept idling. Rather than merely idling, a system that integrates principles of the present invention can be kept warm while accomplishing beneficial charging and discharging. A system kept warm in this manner could respond to a grid operator more quickly and responsively, e.g., 15 to 30 minutes. Reducing the time lag so dramatically makes grid management much easier for a grid operator. The ability to respond faster also is more valuable to the grid operator, allowing a more responsive system to earn more revenue than a slower responding system.

In one aspect, the present invention relates to a system for storing and supplying thermal energy, comprising:
  (a) a supply comprising a molten fluid;
  (b) a heating system that is thermally coupled to a flowing portion of the molten fluid in a manner effective to allow the heating system to heat the flowing portion of the molten fluid, wherein the heating system is electrically coupled to a source of electricity that supplies an electric current to the heating system, wherein the heating system draws and uses the electric current to generate heat used to heat the flowing portion of the molten fluid; and
  (c) a control system that uses information indicative of at least one condition of the source of electricity to (i) controllably modulate the amount of electric current drawn and used by the heating system as a function of time to heat the flowing portion of the molten fluid to store energy from the source of electricity in the molten fluid, wherein the amount of electric current draw is increased and decreased as a function of time responsive to the information; and (ii) to controllably modulate the rate at which thermal energy stored in the molten fluid is discharged, wherein the rate of the discharge is modulated as a function of time responsive to the information.

A method of storing thermal energy, comprising the steps of:
  (a) providing a system for storing thermal energy according to Claim 1;
  (b) receiving signal communications provided by an operator of the electricity source;
  (c) using the signal communications to modulate electricity used by the heating system to heat the flowing portion of the molten fluid; and
  (d) using the signal communications to modulate the flow rate of the flowing portion of the molten fluid.

A power system, comprising:
  (a) an energy storage and supply system that stores and supplies electrical energy on demand, comprising:
    (i) a supply comprising a molten fluid;
    (ii) a heating system that is fluidly coupled to the flowing portion of the molten fluid in a manner effective to allow the heating system to heat the flowing portion of the molten fluid to a temperature in the range from 500 C to about 800 C, wherein the heating system is electrically coupled to a source of electricity supplied at a voltage in the range from about 480 volts to about 200 kV;
    (iii) a control system that uses information indicative of at least one condition of the source of electricity to (i) controllably modulate the amount of electric current drawn and used by the heating system as a function of time to heat the flowing portion of the molten fluid to store electrical energy from the source of electricity in the molten fluid, wherein the amount of electric current draw is increased and decreased as a function of time responsive to the information; and (ii) to controllably modulate the rate at which thermal energy stored in the molten fluid is discharged, wherein the rate of the discharge is modulated as a function of time responsive to the information; and
    (iii) a working fluid thermally coupled to the molten fluid in a manner effective to transfer heat energy from the molten fluid to the working fluid.
  (b) an additional power supply entity that supplies electrical energy;
  (c) a grid operator;
  (d) a plurality of end users; and
  (e) a distribution network that distributes electrical energy from the energy storage and supply system and the additional power supply entity to the end users.

In another aspect, the present invention relates to method of storing thermal energy, comprising the step of using a system described herein to heat the flowing portion of the molten fluid.

In another aspect, the present invention relates to method of making electricity, comprising the step of using the system described herein to make electricity.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

Figure 1:
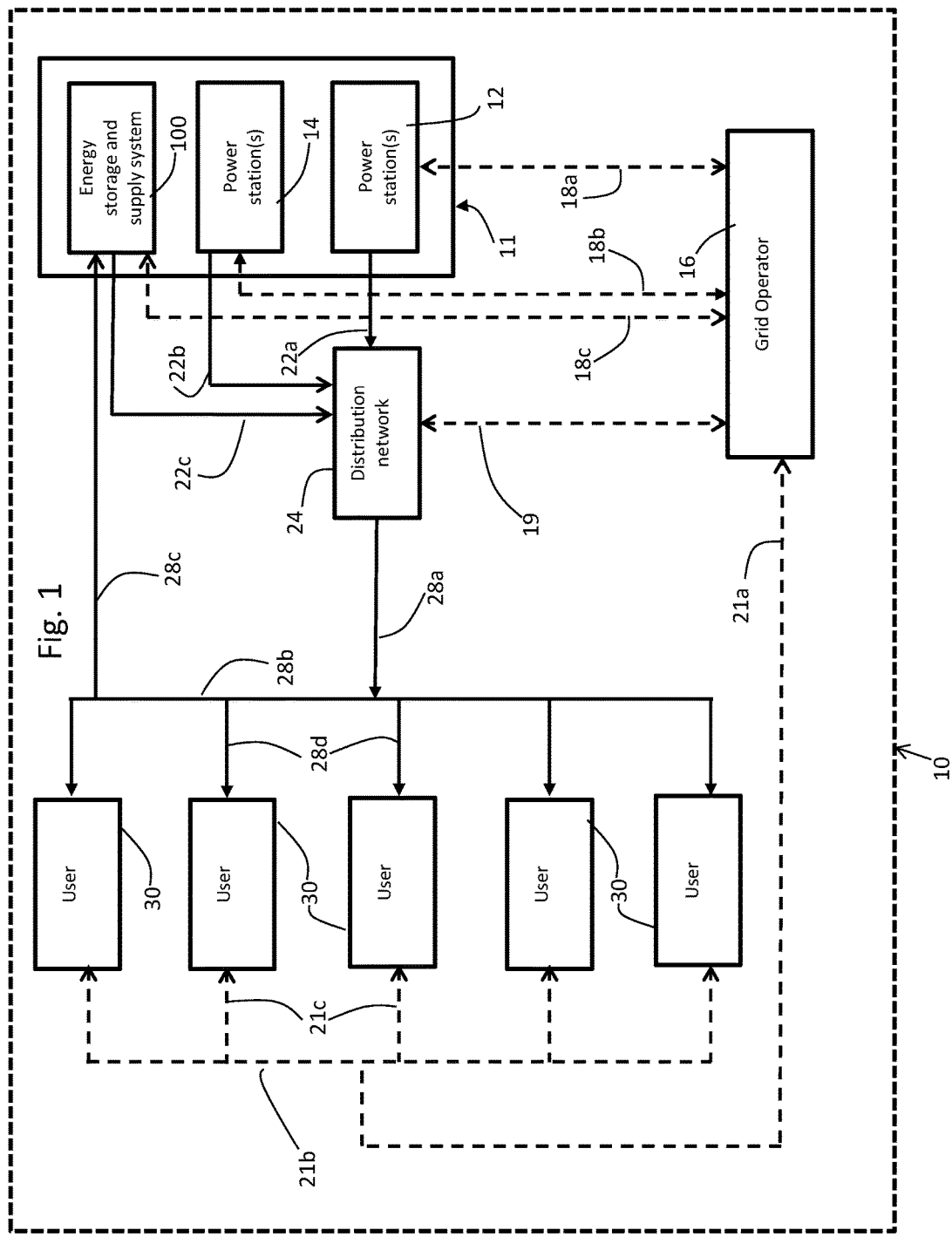
FIG. 1 is a schematic diagram of an electric power system incorporating an energy storage and supply system of the present invention.

FIG. 1 schematically illustrates an electric power system 10 incorporating an energy storage and supply system 100 of the present invention. Electrical power system 10 generally includes a network of elements that generate, supply, distribute, and use electric power. Electric power system 10 can be a large-scale system that encompasses the supply distribution and use of electrical energy for a region, town, city, metropolitan area, state, or even a larger geographic area. A large scale electric power system sometimes may be referred to as "the grid." Smaller electrical power systems are also implemented for industrial sites, hospitals, commercial buildings, and homes, often supplying, distributing, and using power at a single locale or portion(s) of a locale. The present invention advantageously may be integrated with electric power systems of any scale, but is particularly useful in larger scale power systems. For purposes of discussion, electric power system 10 has features of a large scale electric power system that generates, supplies, and distributes electric power for a plurality of users 30. Energy storage and supply system 100 of the present system is integrated into system 10 and functions as both a supplier and a user of electrical power within the electric power system 10.

System 10 includes a plurality of power supply entities 11 that supply electric power used in system 10. For example, system 10 may include at least one intermittent power plant 12 and at least one dispatchable power plant 14. Power plants 12 and 14 can use a variety of renewable and/or nonrenewable resources to generate and supply electric power. Energy storage and supply system 100 of the present invention also, as one function, serves as a supplier of electric power generated, supplied and used in system 10. Electric power suppliers 11, such as power plants 12 and 14 and energy storage and supply system 100, supply electric power to distribution network 20 via transmission lines 22a, 22b, and 22c. In many instances, transmission lines 22a, 22b, and 22c carry electric power at relatively low voltages on the order of about 69 kV to 500 kV volts.

System 10 also includes a grid operator 16, also known as a transmission system operator or simply as an operator. One function of grid operator 16 is to manage the security of the power system in real time and to co-ordinate the supply and demand for electricity. Desirably, grid operator 16 manages system 10 in a manner to avoid undue fluctuations in frequency or interruptions of supply. The grid operator 16 may be owned by a transmission grid company or may be fully independent. In some instances, a grid operator 16 is wholly or partly owned by state or national governments. In many cases grid operator 16 is independent of electricity supplying entities (upstream entities) as well as electricity distribution entities (downstream entities).

The grid operator 16 in many modes of practice works to maintain a continuous (second-by-second) balance between electricity supply from power stations and demand from consumers. The grid operator 16 also may work to ensure the provision of reserves that will allow for sudden contingencies. The grid operator 16 may achieve this by determining an optimal combination of generating stations and reserve providers for each market trading period, instructing generators when and how much electricity to generate, and managing any contingent events that cause the balance between supply and demand to be disrupted. Grid operator staff may undertake this work using sophisticated energy modelling and communications systems. Accordingly, grid operator 16 exchanges communications comprising grid information with other entities in the electric power system via communication pathways 18a, 18b, 18c, 19, 21a, 21b, and 21c. Each of these communication pathways independently may include wired and/or wireless modes of communication.

The abilities of energy storage and supply system 100 to receive, store, and supply electrical power are described in further detail below. As an overview of these abilities, system 100 in one exemplary mode of practice serves as a large scale facility for storing substantial amounts of electrical energy as thermal energy in a molten fluid, such as molten salt. In exemplary modes of practice, the system 100 serves as a rechargeable thermal battery for storing and supplying electric energy on demand. System 100 modulates the rates at which electrical energy is drawn from the electric power system 10 to heat the molten fluid responsive to one or more kinds of grid information such as grid conditions, grid frequency, energy demand, energy supply, energy price, signals from the grid operator, combinations of these, and the like. Heaters integrated into system 100 are operated at atypically high voltages to help allow the thermal battery capacity to be charged efficiently and responsively to the grid information. System 100 also modulates the rates at which electric energy may be discharged responsive to one or more kinds of grid information. The discharge may occur independently or may be coordinated with charging, as desired.

To provide an appreciation of the energy storage capabilities of the present invention, one embodiment of the present invention would provide at least 100 megawatt hours of storage. The charged system would be able to discharge in one mode of practice at rates from 0 to at least 20 megawatts. At discharge rates of 10 to 20 megawatts, the system could provide power for a period of 5 to 10 hours before needing to be re-charged. The system also would be able to store thermal energy for extended periods of time. In other words, thermal energy can be quickly incorporated into the thermal storage medium, and then the thermal storage medium retains that heat very well, cooling down very slowly. In some modes of practice, the system would lose less than 1% of heat energy per day due to thermal losses during a period of inactivity. This would allow electric energy to be stored for many days without undue thermal losses.

This is a substantial amount of energy storage and supply. To appreciate the scale capabilities, consider that the average annual energy consumption of a U.S. residence in 2012 has been reported to be 10.8 megawatt-hrs. This corresponds to a daily energy consumption of 0.0296 Megawatt-hrs per day for each residence, which in turn corresponds to 0.00123 megawatts-hours per hour. A small town with 5000 residences (a population of about 20,000 persons if the average household includes 4 persons) would consume on average 6.2 megawatt-hours of electric power each hour. Exemplary embodiments of system 100 having a storage capacity of at least 100 megawatt-hours could supply the electrical needs for the residents of this town for over 16 hours in the event of a power outage. In many situations, this amount of time is sufficient for power to be restored. The present invention, therefore, is useful in one mode of practice to provide back-up power during a power outage. Additional uses of the present invention are described below.

Still referring to FIG. 1, distribution network 20 includes a distribution network 24 to distribute electric power supplied by the power suppliers 11 to other entities in the electric power system 10. In a typical situation, the distribution network 24 comprises one or more power substations (not shown in FIG. 1; shown as substation 26 in FIG. 2) coupled to each other via high voltage transmission lines (not shown). In a typical situation, transmission lines between substations operate at voltages on the order of about 69 kV to about 500 kV. Distribution network 24 supplies electrical power via transmission lines 28a, 28b, 28c, and 28d (in many instances distributing power at 34 KV and below) to other entities including end users 30 and energy storage and supply system 100.

Figure 2:
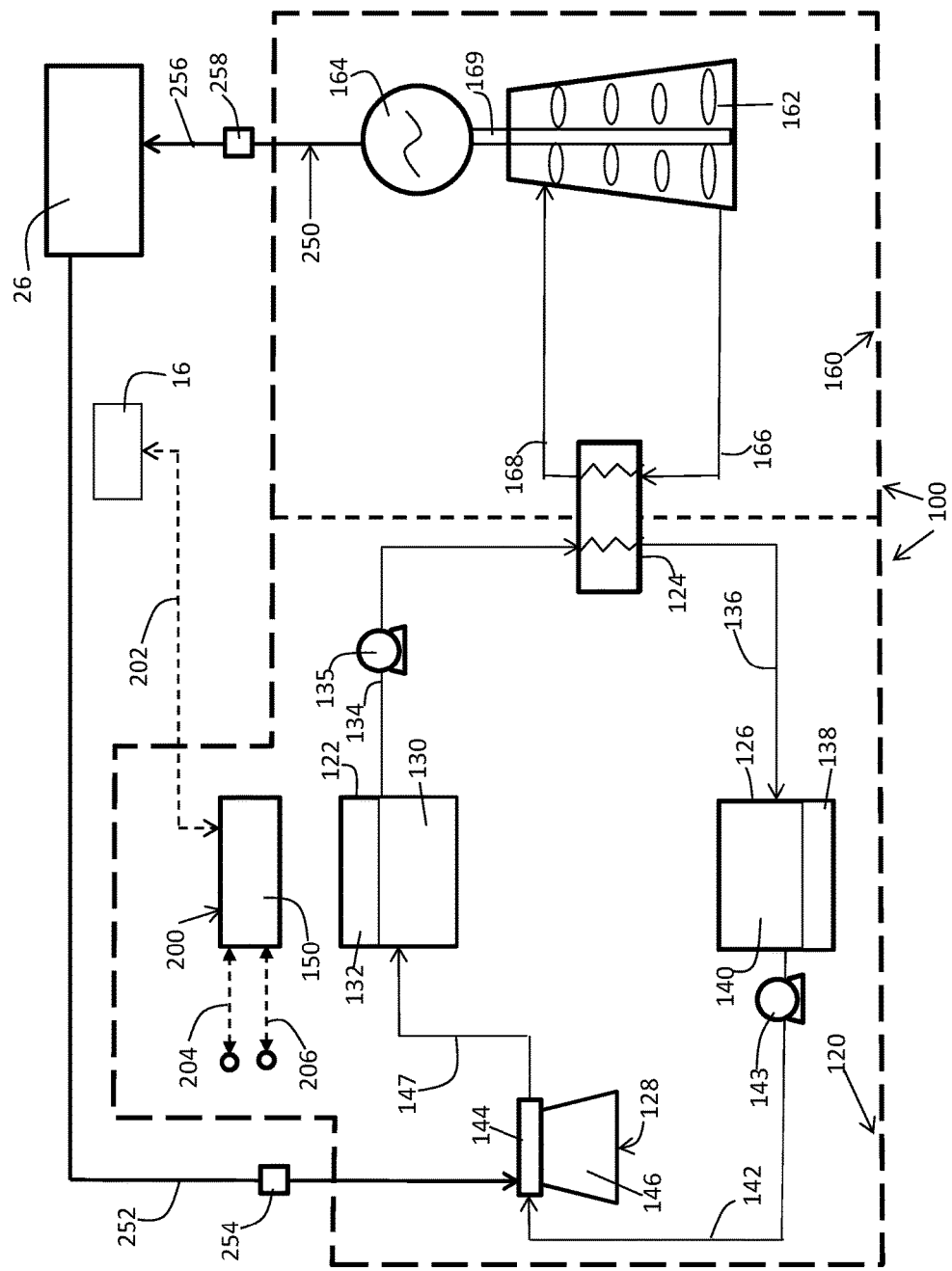
FIG. 2 is a schematic diagram of the energy storage and supply system of FIG. 1.

FIG. 2 schematically illustrates energy storage and supply system 100 of the present invention in more detail. System 100 serves as an energy storage and delivery resource in which electric energy is converted into thermal energy that is stored in a molten fluid and then delivered again, such as through a steam cycle. Consequently, system 100 shall also be referred to herein as "ESDR system 100." The molten fluid can store the heat efficiently for a wide range of time periods, even for long periods of time, if desired. In many modes of practice, the storage period can range from 1 minute to eight weeks, preferably 4 hours to one day. ESDR system 100 advantageously modulates the heating of the molten fluid responsive to information comprising grid information.

ESDR system 100 can be discharged at one or more later points in time on demand to provide an energy output. ESDR system 100 advantageously modulates the discharge of thermal energy from the molten fluid responsive to information comprising grid information. The discharge modulation advantageously may occur independently from or may be coordinated with the charging of the molten fluid. The molten fluid, for example, can be charged and discharged at different times, during time periods that overlap, or during the same time period, as desired.

The energy output can be provided in one or more forms. For example, the thermal energy stored in the molten fluid can be converted into other forms of energy such as kinetic energy, pressure energy, acoustic energy, and/or electrical energy. As another alternative, the thermal energy can be used directly to provide thermal energy for heat exchange or other heating operation. The heat can be used for industrial purposes to help provide heat to carry out chemical reactions or other industrial process. The heat can also be used to heat the interiors of structures to make the interiors more comfortable for occupants. FIG. 2 shows an embodiment in which a combination of energy outputs is derived from system 100 to ultimately supply electrical energy to substation 26. Substation 26 is a component of the distribution network 24 shown in FIG. 1.

ESDR system 100 fills the need for storage devices that are able to store large quantities of electrical energy to help improve the operation, efficiency, maintenance, and other characteristics of large scale electric power systems. For example, system 100 can store electricity during periods in which electricity is available at low cost, or even negatively priced, and then re-deliver the electricity later when the electricity can be supplied at higher prices. As another example, ESDR system 100 can store large quantities of electricity as thermal energy when the amount of electricity in electric power system 10 (FIG. 1) exceeds demand. As still another example, system 100 can store and re-deliver electricity to help absorb fluctuations in the amount of electricity being distributed by electric power system 10 in order to make the distribution of electricity more uniform. More uniform distribution is desirable in many instances such as when demand fluctuates, electric power system 10 (FIG. 1) has operational issues, or the like.

ESDR system 100 also allows electric power from intermittent sources such as solar photovoltaics to be integrated more efficiently. For example, system 10 can store electricity for future use when current demand for electricity is relatively low. This allows more electricity to be used that otherwise could be wasted if the excess energy were not able to be stored. As another example, if an intermittent power station 14 is producing more energy than is needed by the distribution system, ESDR system 100 can absorb the excess energy for later use when intermittent power station 14 is not producing any energy. In another example, if a portion of electric power system 10 is damaged or otherwise compromised, ESDR system 100 can supply electricity on demand until the normal operation of system 12 can be restored.

In preferred modes of practice, ESDR system 100 is responsive to grid information to modulate the rate at which electricity is drawn from the grid and then stored as thermal energy. For example, ESDR system 100 may be operating to store electricity during a period in which the electricity can be harvested from electric power system 10 at relatively low cost or when the electric power system is producing electric power beyond what is needed by the current demand. Such a period, in some instance, may extend for up to several hours. Throughout such a time span, the supply and demand for electricity in electric power system 10 can fluctuate on a short term basis. When grid information indicates only a slight excess of energy, ESDR system 100 can respond to that information by storing electricity at a slower rate. When grid information indicates a sharp increase in over-supply of energy, ESDR system 100 can respond to that information by storing electricity at a higher rate. The electric current draw can be modulated in real time to be quickly responsive to grid conditions. Slower-responding systems provide less value to the grid operator and may respond only after the grid information becomes obsolete. The re-delivery of stored electricity also can be modulated in response to grid information such as changing demand for electricity elsewhere in the electric power system 10. ESDR system 100, in practical effect, is a smart, rechargeable, thermal battery in such modes of practice.

ESDR system 100 includes as main components a molten fluid block 120, a power block 160, control system 200, and power transmission system 250. Molten fluid block 120 includes elements to allow ESDR system 100 to function as a rechargeable battery to store electrical energy as thermal energy in a molten fluid. In this embodiment, power block 160 incudes elements that allow thermal energy stored in the molten fluid to be converted into electrical energy. Control system 200 includes elements that allow ESDR system 100 to communicate externally with one or more elements of the electrical system 10 (FIG. 1) into which ESDR system 100 is integrated. Control system 200 also includes elements to control the operation of the elements in the molten fluid block 120. Power transmission system 250 electrically couples ESDR system 100 to one or more other components of electric power system 10. For purposes of illustration, power transmission system 250 includes elements that facilitate receiving and transmitting electrical power with another component of electrical power system 10 in the form of substation 26.

Molten fluid block 120 generally includes a first molten fluid tank 122, an output heat exchanger 124, a second molten fluid tank 126, and a charging station 128. First molten fluid tank 122 holds a first, relatively hot supply 130 of molten fluid. For example, in a mode of practice in which the molten fluid is a molten salt, the hot supply 130 may be at a temperature in the range from about 400 C to about 800 C. A suitable temperature for the hot supply would be 560 C +/−10 C in one embodiment. Depending upon whether first molten fluid tank 122 is full, partially full, or empty, the internal volume may include a headspace 132 above the molten fluid supply 130.

First molten fluid tank 122 is a "hot" storage unit that holds a supply of relatively hot molten fluid that has been "charged" with thermal energy at charging station 128. When molten fluid block 120 is fully charged with thermal energy, the first molten fluid tank 122 is relatively full and even may be completely full such that there is no headspace inside the tank 122.

Fluid conduit 134 fluidly couples first molten fluid tank 122 to output heat exchanger 124. This allows molten fluid from supply 130 to be conveyed to the output heat exchanger 124. Pump 135 may be used to help this transport. Heat exchanger 124 is used to output, or transfer, thermal energy from the molten fluid to the power block 160. This heat transfer discharges the molten fluid in the sense that thermal energy stored in the fluid is withdrawn as a consequence of the heat transfer. The amount of molten fluid held in the first tank 122 is generally reduced as the molten fluid is withdrawn via conduit 134 to be discharged at the output heat exchanger 124. Because heat exchanger 124 interfaces with both the molten fluid block 120 and the power block 160, heat exchanger 160 can be viewed as a component of both blocks.

Conduit 136 fluidly couples the output heat exchanger 124 to the second molten fluid tank 126. Second molten fluid tank 122 holds a second, relatively cold supply 138 of the molten fluid. Depending upon whether second molten fluid tank 126 is full, partially full, or empty, the internal volume may include a headspace 140 above the molten fluid supply 138. The second supply 138 is cold relative to the hot supply 130 in that the molten fluid discharged thermal energy to the power block in the output heat exchanger 124. The second molten fluid tank 126, therefore, may be viewed as a "cold" storage tank for the molten fluid. When the molten fluid block 120 is fully discharged such that the hot storage tank 122 is empty, the cold storage tank 126 is relatively full, and even may be completely full such that there is no headspace 140. Although colder than the hot supply 130, the molten fluid of the cold supply 138 is still desirably maintained in a fluid, molten state. For example, in a mode of practice in which the molten fluid is a molten salt, the cold supply 138 may be at a temperature in the range from about 230 C to about 350 C. In one embodiment a cold supply at a temperature of 250 C +/−10 C would be suitable.

Conduit 142 fluidly couples second molten fluid tank 126 to the charging station 128. Pump 143 may be used to help transfer molten fluid through conduit 142. Charging station 128 is where electrical energy is converted into thermal energy and stored in the molten fluid. From the perspective that molten fluid block 120 is a battery, storing thermal energy in the molten fluid charges the battery.

Charging station 128 generally includes an electrical heating system 144 supported upon an elevation structure 146. Heating system 144 is elevated sufficiently high to allow heated molten fluid to drain by gravity into first molten fluid tank 122 via conduit 147. To help modulate the electric current draw by heating system 144 responsive to information comprising grid information, a control system 200 including control panel 150 is communicatively coupled to substation 26 via communication interface 202. Electric power is drawn by heater system 144 from the substation 26 via transmission line 252. Meter 254 is used to help monitor the flow of electric power to control panel heating system 144.

In the operation of heating vessel 144, electric power is supplied via transmission line 252 at high voltage in the range from 480 volts to 230 kV, preferably 480 volts to 70,000 volts (e.g., 69,000 volts in an illustrative embodiment), more preferably 480 volts to 40,000 volts (e.g., 32,000 volts in an illustrative embodiment). A distinct advantage of the present invention is that heating system 144 uses the electric power in this voltage range while minimizing need for transformers to step down voltage to lower levels if desired. In other words, the systems of the present invention are compatible with voltage that is directly available. The present invention is able to use this atypically high voltage for heating by modulating the current at which the heating equipment draws electricity. Operating the heater at such an atypically high voltage avoids the expense of providing and operating an additional transformer and allows for efficient transfer of electrical power to heater system 144 with minimal power losses. Substantial electrical power is converted into heat very efficiently at high throughput with such a high voltage interface.

Another advantage of using higher voltage levels is that finer wire can be used for line 252 to transmit higher voltages. This is counterintuitive, but transmitting a given amount of power at lower voltages requires much thicker, more expensive wiring. Because wiring to handle so much power transmission can be a significant expenses in creating such a charging system, being able to use finer wire saves considerable sums.

In one illustrative embodiment, heating system 144 heats a cold supply of molten fluid, e.g., a molten salt at a temperature of 250 C +/−10 C to a hot temperature, e.g., 560 C +/−10C, to charge the salt with thermal energy. Notably, the heating system 144 brings the fluid from the cold, discharged state to the hot, charged state using electric energy. As described below, solar energy may be used in combination with electrical energy to help provide a portion of the thermal energy used to bring the fluid from the cold to the hot state. This charging of the fluid is distinguishable from heat tracing, freeze protection, and similar system components that may be used to keep the fluid in a molten state and to help prevent thermal shock as the hot fluid flows through the system, regardless of whether such state is the hot, charged state, or the cold, discharged state.

Figure 3:
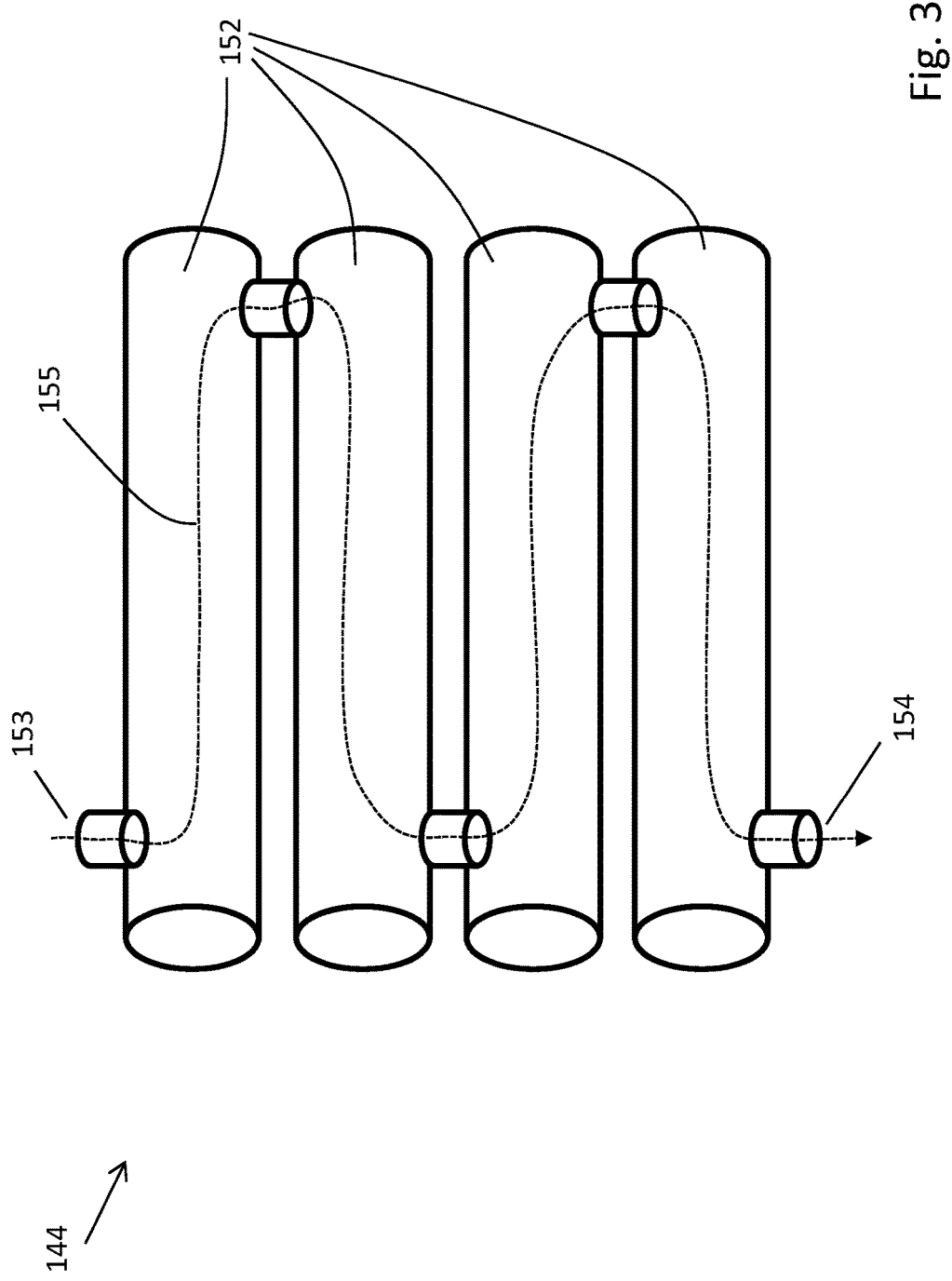
FIG. 3 is a schematic diagram of heating vessels used in the heating system of FIG. 2.
Figure 4:
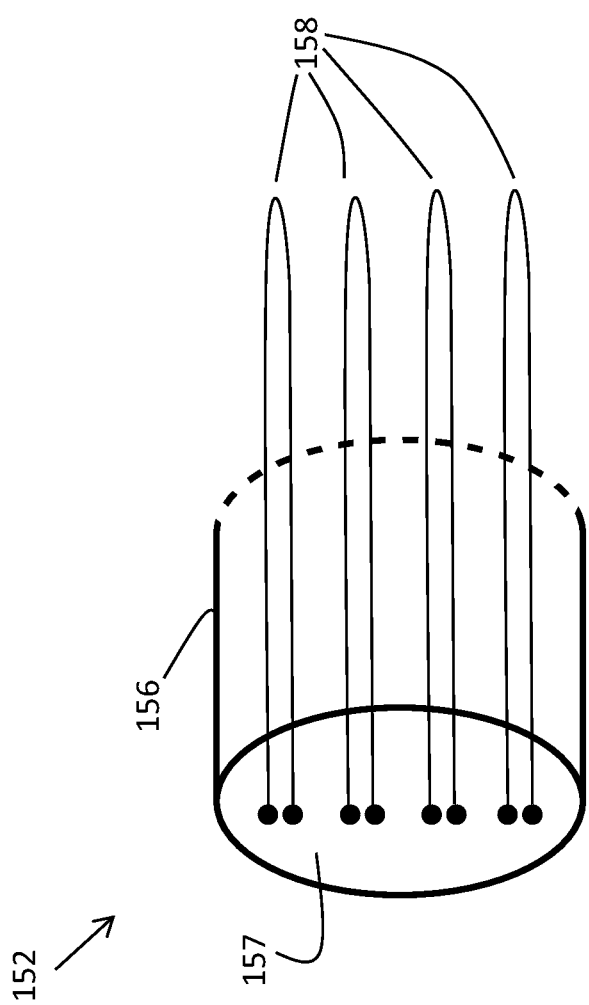
FIG. 4 is a close-up, schematic view of a portion of a heating vessel of FIG. 3.

FIGS. 3 and 4 show details of portions of heater system 144 in more detail. FIG. 3 shows an embodiment of heater system 144 comprising a plurality of heater vessels 152 fluidly coupled in series. FIG. 3 shows a series of vessels 152 being stacked in a 1×4 array, but other options may be used. For example, a greater or lesser number of heater vessels may be used. In many suitable embodiments using 1 to 10 heater vessels connected in series and/or in parallel may be used. Molten fluid enters the bank of heater vessels 152 through inlet 153 and exits the bank of heater vessels from outlet 154 into conduit 147. Molten fluid flows through heater vessels 152 along pathway 155.

FIG. 4 shows a close up schematic view of a portion of one of the heater vessels 152. Vessel 152 has a shell 156 defining an interior 157 through which molten fluid (not shown) flows. Resistance heating elements 158 are deployed in interior 157. In use, electric power heats the resistance heating elements 158, and this heat is then transferred to the molten fluid. Control panel 150 responds to control information in order to modulate the electric energy supplied to the resistance heating elements. Consequently, the rate at which the molten fluid is charged with thermal energy is modulated as well.

A wide range of materials may be used singly or in combination as the molten fluid. Many suitable embodiments of a molten fluid have a melting point that is sufficiently below the cold supply temperature to substantially avoid the risk that the molten fluid could fully solidify. In illustrative modes of practice, the melting point of the fluid phase is at least 50 C, preferably at least 75 C below the cold supply temperature. Many suitable molten fluids have boiling points that are sufficiently above the hot supply temperature to substantially avoid the risk that the molten fluid could boil. In illustrative modes of practice, the boiling point of the molten fluid is at least 50 C, preferably at least 75 C above the hot supply temperature. In one useful embodiment, a molten fluid is in a molten state in a temperature range from about 200 C to about 650 C.

As an option, the molten fluid may incorporate one or more optional constituents that may be dissolved or dispersed in the molten fluid. If dispersed, these may be dispersed as fluids or solids in the molten fluid, in which case the molten fluid serves as a molten liquid carrier for these dispersed material(s). Examples of such optional constituents include phase change materials, materials that allow the molten fluid to be used over a broader temperature range, materials that make the molten salt more thermally or electrically conductive, anti-corrosion materials, materials that adjust the density of the molten fluid, surface tension modifying agents, combinations of these, and the like.

Exemplary molten fluids include a molten metal, metal alloy, intermetallic composition, molten salt, combinations of these, and the like. In more preferred embodiments, the molten fluid comprises one or more molten salts. Exemplary molten salts include LiF, LiCl, LiBr, LiI, $KNO_3$, $NaNO_3$, NaF, NaCl, NaBr, NaI, KF, KCl, KBr, KI, RbF, RbCl, RbBr, RbI, CsF, CsCl, CsBr, CsI, combinations of these, and the like.

Referring again to the embodiment of ESDR system 100 shown in FIG. 2, conduits 134, 136, 142, and 147 desirably are heated, such as by pipe traces or other suitable heating techniques, in order to prevent thermal shock when molten fluid is conveyed through system 100. Molten fluid can be circulated throughout ESDR system 100 continuously or on demand. The flow rate of the molten fluid also can be modulated on demand. In more preferred embodiments, the flow of the molten fluid is coordinated with the modulated electric current draw of heater system 144 in order to output molten fluid at a desired temperature. For example, to achieve a particular output temperature at a given electric current draw, a flow rate of the molten fluid is selected so that the flow of molten fluid entering the heater system 144 at a particular temperature is heated to the desired output temperature. If the electric current draw is reduced responsive to grid information, less heating energy is available. Consequently, to achieve the same output temperature, the flow rate of the molten fluid is reduced in a manner effective to provide the desired degree of heating. On the other hand, if the electric current draw is increased such that more heating energy is available, the flow rate of molten fluid can be increased in a manner effect to provide the desired degree of heating.

Power block 160 is used to recover thermal energy from the molten fluid. In this embodiment, power block 160 is used to convert the recovered thermal energy into electrical energy. In other modes of practice, the thermal energy can be used to provide heat energy or can be converted into other energy forms including electric energy, acoustic energy, pressure, kinetic energy, and/or the like.

Power block 160 generally includes a steam turbine 162 and a generator 164. Conduits 166 and 168 fluidly couple turbine 162 to output heat exchanger 124. A working fluid is circulated in conduits 166 and 168. In use, a working fluid is heated in heat exchanger 124. Examples of working fluids include $H_2O$ as well as alkanes, fluorinated alkanes, ethers and/or fluorinated ethers such as isobutene, toluene, n-pentane, and the like. Heat is supplied by the hot molten fluid supplied to heat exchanger 124 via conduit 134. The steam is heated to a much higher temperature and pressure via heat exchange with the molten fluid. The molten fluid cools as a result and is conveyed to the cold storage tank 126. The hot, pressurized steam drives turbine 162, causing turbine shaft 169 to rotate. The rotation of shaft 169 allows generator 164 to generate electricity. The generator 164 is electrically coupled to substation 26 via transmission line 256. The generated electricity is supplied by generator 164 to substation 26 via transmission line 256. Meter 258 monitors the flow of electricity to substation 26.

In addition to control panel 150, control system 200 also may include other features. Control system 200, for example, may include communication interface 202 for communicatively interfacing with the grid operator 16 or other components of electrical power system 10 (FIG. 1) into which ESDR system 100 is integrated. Examples of the kinds of grid information that can be communicated to control system 200 via interface 202 include grid frequency, a grid operator signal, electricity pricing for electrical power obtained from the grid, pricing for electrical power supplied to the grid, a level of electric power demand by the grid, a level of electric power supply to the grid, availability and integrity of the grid, combinations of these and the like. For example, grid frequency can be useful insofar as the ESDR system 100 is intended to stabilize the balance of supply and demand of energy on the grid; if there is an excess of supply relative to demand, grid frequency will increase, and ESDR system 100 could respond automatically by absorbing additional energy and returning the grid to a balanced state.

Control system 200 also includes a communication interface 204 for communicating with control panel 150 in order to modulate the electric current draw of heater system 144 responsive to grid information. Control system 200 also includes a communication interface 206 for communicating with other components of molten fluid block 120. For instance, control system 200 can use interface 206 to communicate with and help control pumps, heating traces on conduits, valves, sensors, and the like. Control system 200 may communicate via interfaces 202 and/or 204 and/or 206 via wired and/or wireless transmission.

ESDR System 100 also includes power transmission system 250. This system includes transmission lines 252 and 256 and meters 254 and 258, discussed above.

In one mode of operation of ESDR system 100, molten fluid is heated, or charged at charging station 128. The heating is modulated responsive to information comprising grid information. The heating occurs under medium voltage, e.g., 4,160 volts to 100,000 volts. In exemplary embodiments using molten salt, the salt is heated to a temperature in the range from 500 C to 800 C. Because the heating system 144 is elevated above tank 122 by the structure 146, the heated molten fluid then drains by gravity from the charging station 128 into the first molten fluid supply tank 122. There, the heated fluid is stored until it is desired to recover the thermal energy in the fluid. While in tank 122, the hot fluid may be mixed with a suitable mixing apparatus (not shown). Upon demand, hot molten fluid is pumped from tank 122 to output heat exchange 124 in order to recover thermal energy from the hot molten fluid and transfer that heat energy to a working fluid in power block 160. The heat transfer is modulated responsive to information comprising grid information. After the heat transfer, molten fluid will have cooled to a lower temperature such as a temperature in the range from 230 C to 350 C. The cooled molten fluid is then conveyed to the second molten fluid supply tank 126 and stored there. While in tank 126, the cooled fluid may be mixed with a suitable mixing apparatus (not shown). The cooled molten fluid may then be circulated back to the charging station 128 for another cycle of use.

Figure 5:
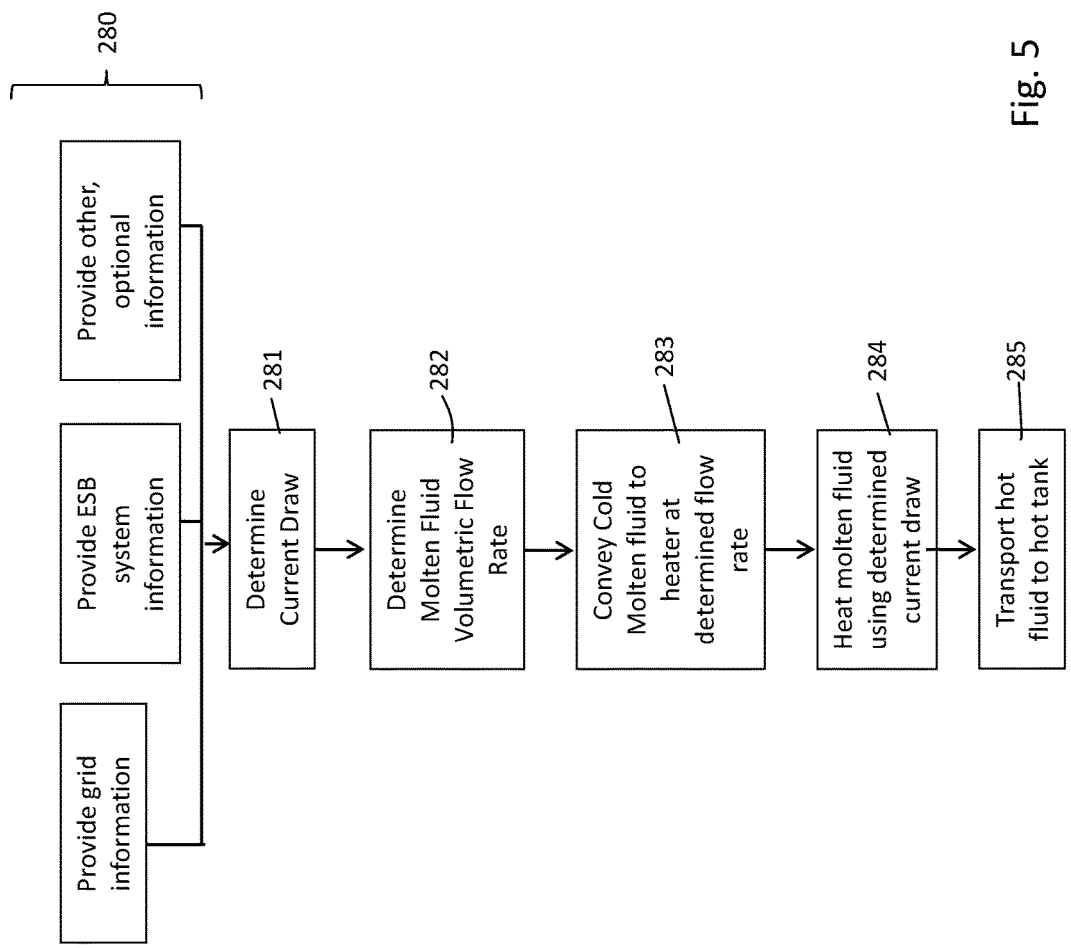
FIG. 5 is a schematic diagram of how the control system used in the energy storage and supply system of FIG. 2 uses information in order to modulate electric current draw of heating vessels and to modulate the flow rate of a molten fluid used in the system of FIG. 2.

FIG. 5 schematically shows how control system 200 generates control instructions using information comprising grid information, system information, and other optional information. In step 280, system 200 gathers information that will be used to determine both an electric current draw for heater system 144 as well as a flow rate of molten fluid needed to heat the molten fluid to a desired target temperature. The gathered information includes grid information obtained by system 200 from interface 202. One type of grid information is a grid signal that instructs the power that should be used at a particular time. In some grids, such a signal is pulsed as a signal every 4 seconds. This grid signal informs whether the grid allows the power used by ESDR system 100 to operate charging station 128 needs to be turned down or can be turned up and still comply with grid limitations. In other words, the grid signal indicates the maximum power that can be drawn from the grid at a particular time. This power limit changes with changes in grid conditions. In some instances, the maximum available power might be used at charging station 128 to heat the molten fluid. In other instances, less power might be used for heating. Other grid information may include grid frequency, grid pricing, grid supply and demand, current state of operation, schedule operations, outage details, and the like.

The gathered information includes both static and dynamic information about ESDR system 100. This information may include the current volumes of the hot and cold portions of the working fluid, volumes of tanks 122 and 126, working fluid properties and limits, desired working fluid temperatures in the cold and hot portions of the cycle, current temperatures of the hot and cold molten fluid portions, heater configuration, flow rates, and the like. System 200 may use sensors to gather such information. Other system information may be stored and accessed in a memory. Control system 200 may also gather other information such as ambient temperature, weather information, user demand information and the like.

Based upon the gathered information, control system 200 in step 281 determines how much electricity to draw from substation 26 via transmission line 252 to supply to heating system 144 in order to heat the molten fluid at that time. Control system 200 outputs an instruction for heating system 144 to operate at that level. In step 282, control system 200 determines a flow rate of molten fluid that will heat the molten fluid to a desired target temperature when heating in heating vessel 144 at the determined electric current draw. FIG. 5 shows step 282 occurring after step 283. In actual practice, the steps may occur in any order or in parallel.

In step 283, control system 200 outputs instructions to control pumps, valves, heating traces on pipes, etc. to accomplish the desired flow of molten fluid to heater system 144. In step 284, control system 200 outputs instructions to cause the flowing molten fluid to be heated by heater system 144 to the desired target temperature. The heater system operates at the determined electric current draw while the fluid flows at the determined flow rate. In step 285, the heated molten fluid is conveyed to the hot supply tank 122. The process of FIG. 5 may be repeated at a rate such that the electric current drawn by heater system 144 is modulated in a manner sufficiently responsive to the current grid information so that the heating response is undertaken before the grid information becomes obsolete.

Figure 6:
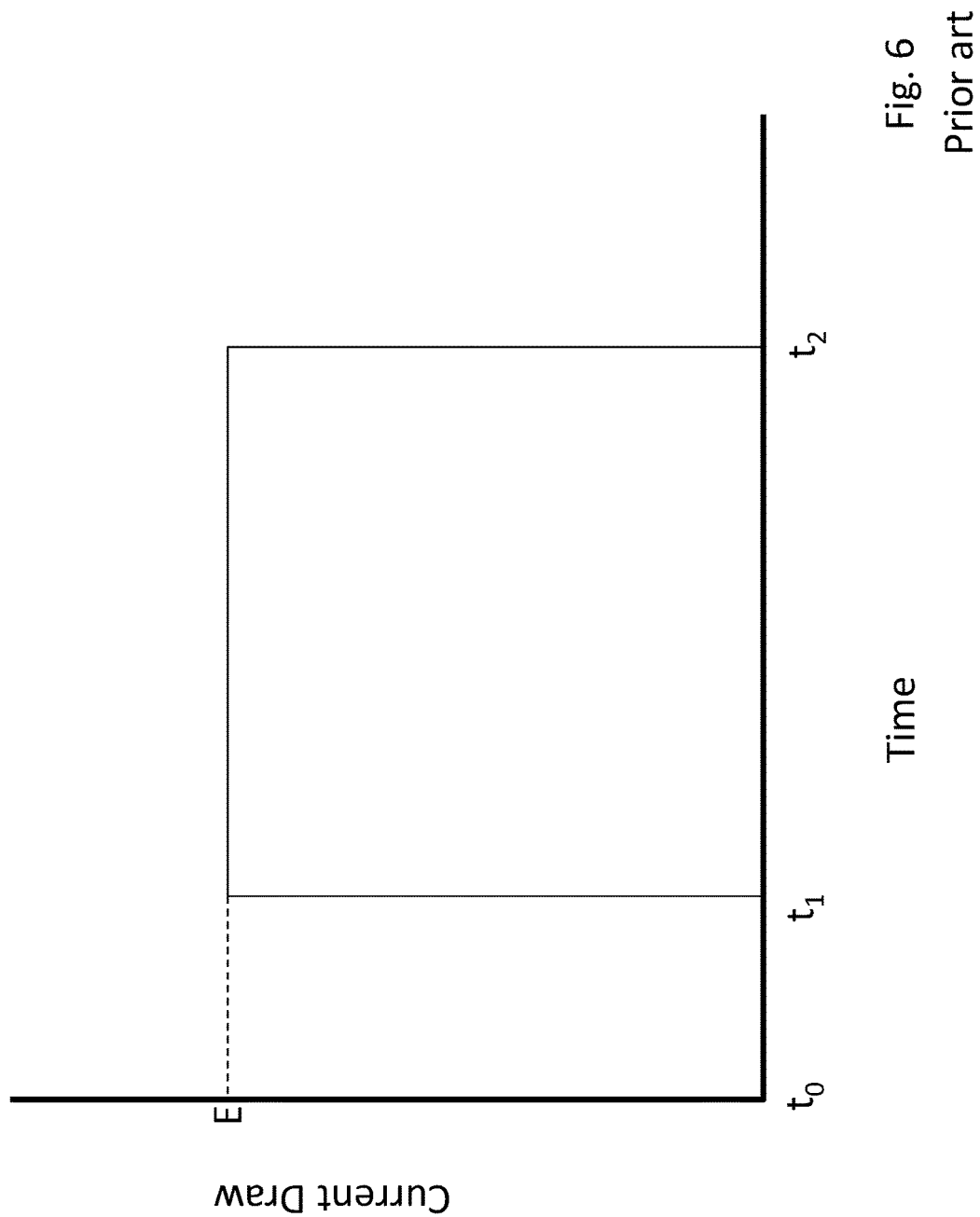
FIG. 6 is a graph showing electric current draw as a function of time for a conventional heating system used to store thermal energy in a molten salt.
Figure 7:
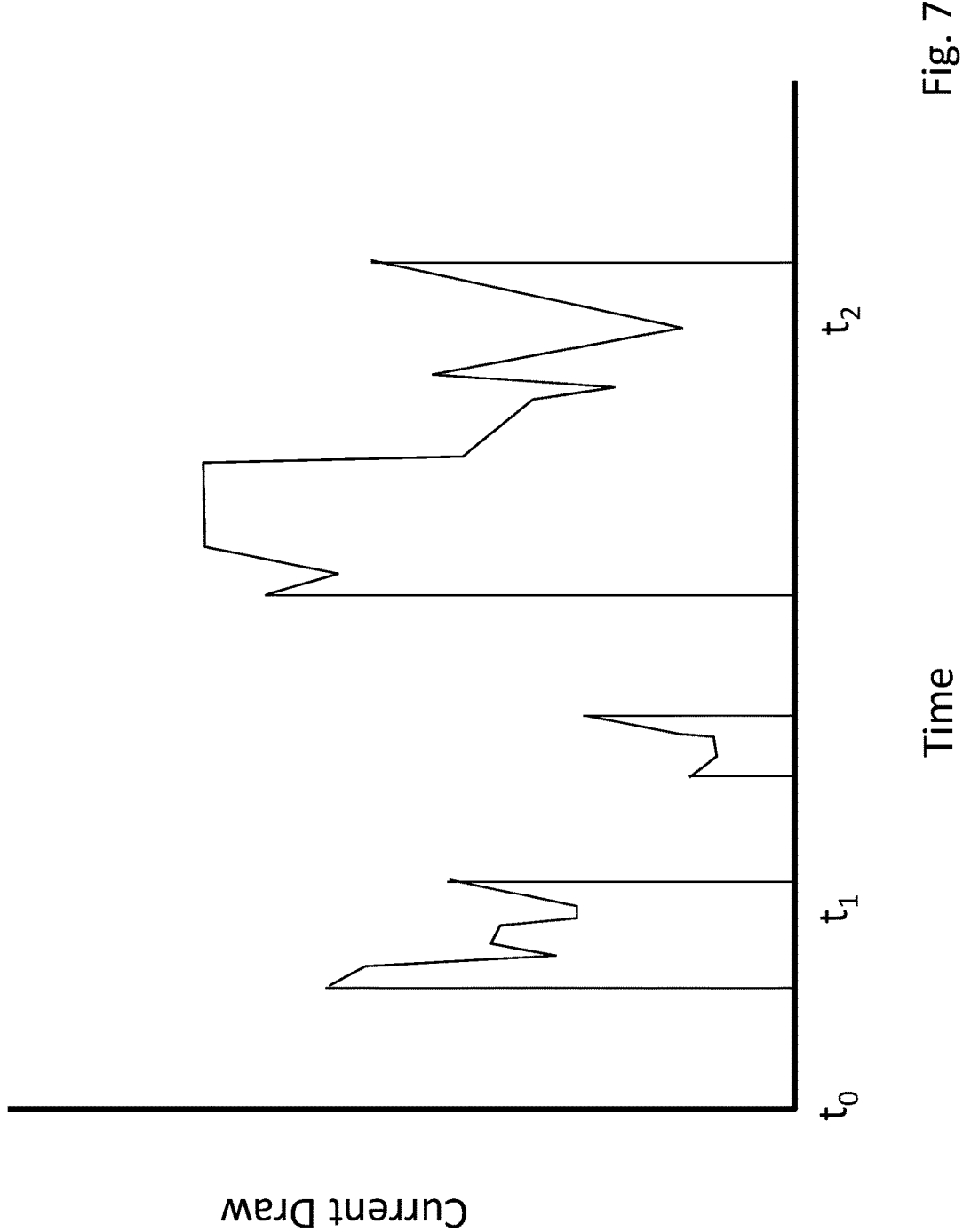
FIG. 7 is a graph showing electric current draw as a function of time for a heating system of the present invention used to store thermal energy in a molten salt.

FIGS. 6 and 7 schematically show how the heating strategy of the present invention responsively draws electricity from the grid to carry out heating operations. FIG. 6 schematically shows a constant draw mode of practice of the prior art. FIG. 6 shows the amount of electric current draw of a heater used to heat molten salt in a one day period. Initially, at $t_0$, the heater used to heat a molten fluid is not drawing electricity, and no heating of molten fluid is occurring. Then, at time $t_1$, a decision is made to draw electricity and operate the heater. The electricity is drawn at a rate of E. This rate of draw than continues at a constant level until a time $t_2$, when the draw is stopped. Heating also stops at this time. Note that the heater is turned on or off. While the heater is on, the electric current is not modulated.

FIG. 7 schematically shows a responsive electric current practiced by the present invention. FIG. 7 shows the amount of electric current of a heater used to heat molten salt in a one day period. During some periods of time, the heater is off and no heating occurs. During other periods, the heater is on. Unlike FIG. 6, however, the electric current is not constant while the heater is one. Rather, control system 200 causes the electric current to be modulated responsive to information comprising grid information. Such responsive modulation provides the grid operator with finer control over the balance of supply and demand on the grid. This finer control, in turn, enables and facilitates the integration of intermittent renewables, the avoidance of costly transmission and distribution system upgrades, and the optimization of the operation of the electrical grid.

Figure 8:
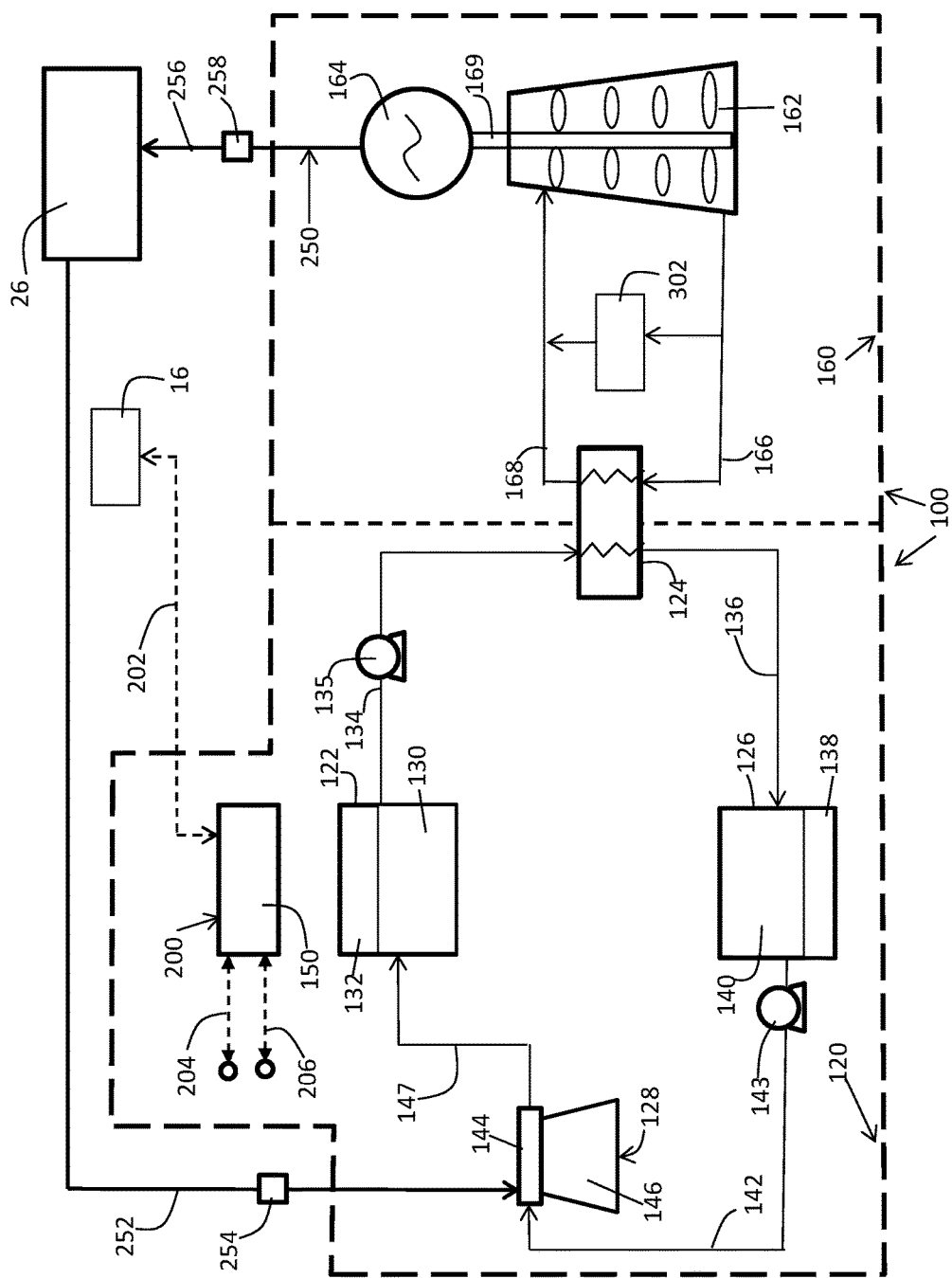
FIG. 8 is an alternative embodiment of the system of FIG. 2 further incorporating an additional heat source in the power block.

FIG. 8 shows how a working fluid cycle in power block 160 can be supplemented. In FIG. 8, ESDR system 10 of FIG. 2 is shown with an extra heat source 302 incorporated integrated into power block 160. Consequently, the working fluid may be heated either by heat exchange at heat exchanger 124 or via heat exchange at supplemental heat source 302. Exemplary supplemental heat sources include solar energy, gas energy, coal energy, nuclear energy, and/or the like. This means that ESDR system 100 is easily integrated into a wide range of existing working fluid cycles to allow ESDR system 100 to be used as an additional heating source for working fluids in existing facilities. ESDR system 100 can share equipment with the existing facility so that integration with the existing facility is cost-effective and increases equipment utilization. Examples of equipment that can be shared include a wide range of common equipment such as pumps, plumbing, turbines, generators, steam/water cycle equipment, and the like.

Figure 9:
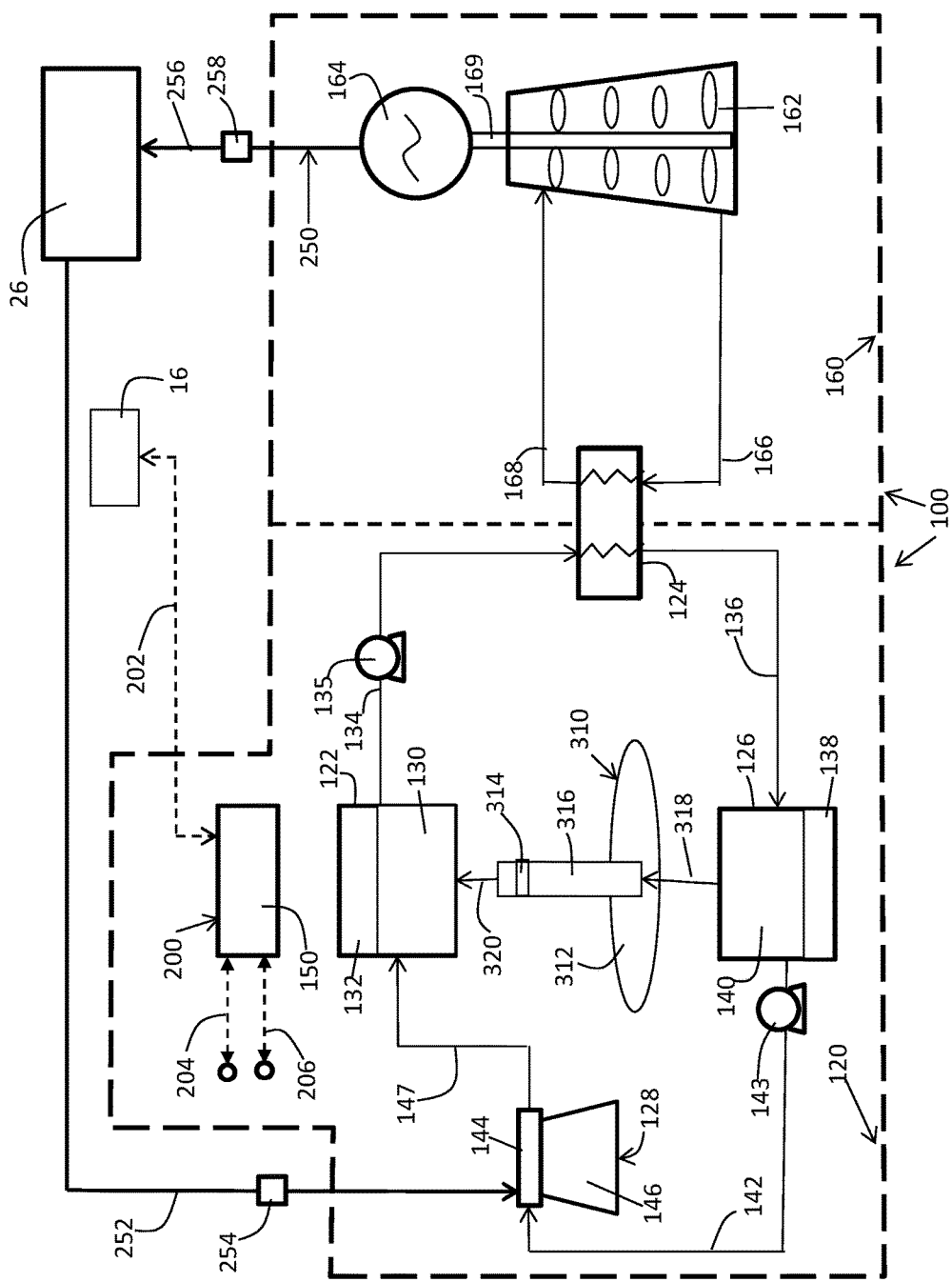
FIG. 9 is an alternative embodiment of the system of FIG. 2 further incorporating a solar heat source in the molten fluid block.

FIG. 9 shows how solar heating can be integrated into molten fluid block 120. In FIG. 9, ESDR system of FIG. 2 is shown with a solar heating source 310 integrated into molten fluid block 120. Solar heating source 310 incudes a field 312 including a plurality of light redirecting elements that redirect and concentrate solar energy (not shown) onto a receiver 314 on a central tower 316. A wide variety of light directing elements may be used in field 312. These include 2-dimensionally contoured reflecting devices such as troughs, Fresnel systems, 3-dimensionally contoured reflecting devices such as dish reflectors, substantially planar devices such as flat mirrors, retroreflective structures, combinations of these, and the like. The molten fluid in cold tank 126 can be circulated via conduit 318 into tower 316 where heat transfer occurs proximal to the receiver 314 to transfer thermal energy from the concentrated solar energy to the working fluid. The heated working fluid is then conveyed from tower 316 to the hot storage tank 122 via conduit 320. In this way, both solar heating and grid responsive electric heating of the molten fluid are used in combination.

Figure 10:
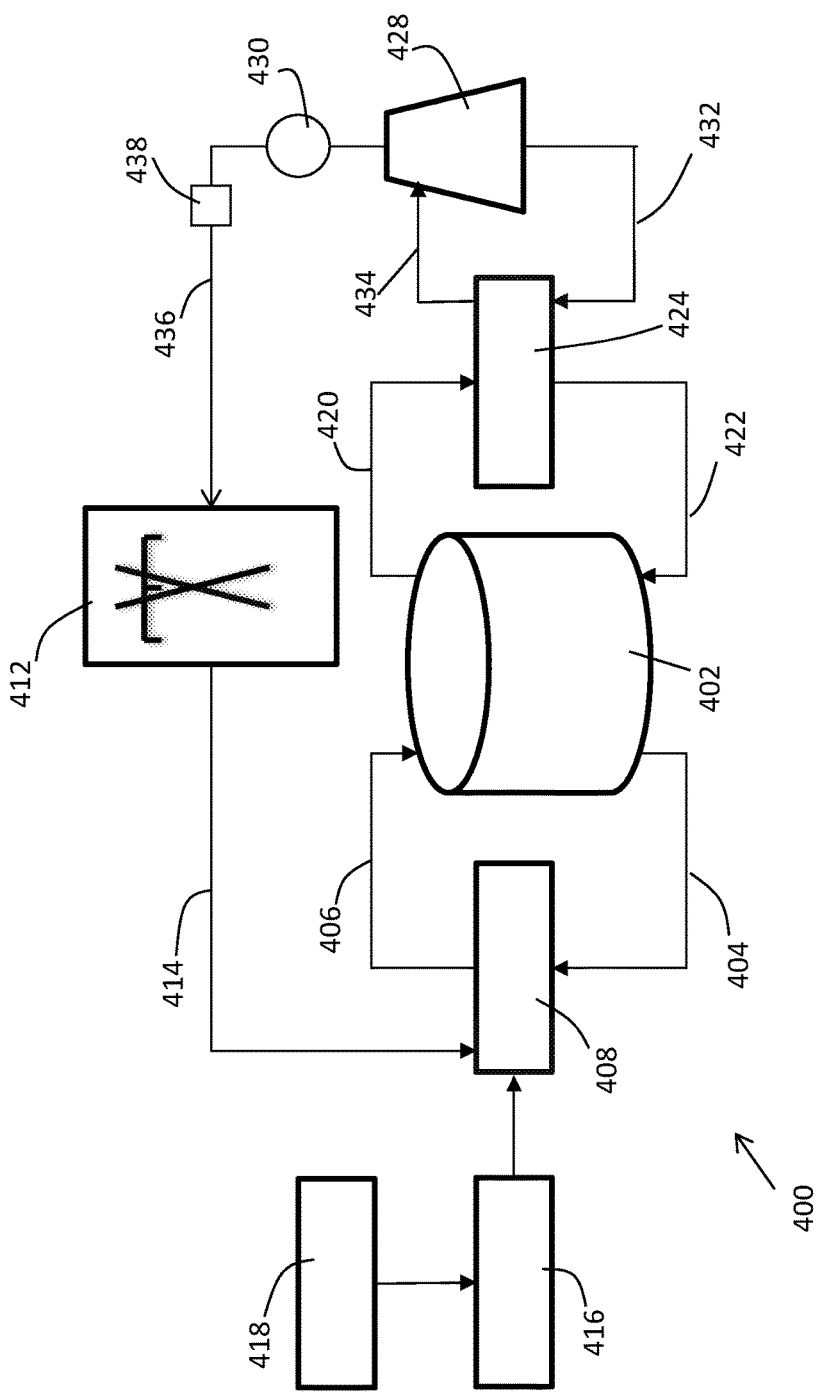
FIG. 10 is an alternative embodiment of an energy storage and supply system using a single tank for handling molten fluid.

FIG. 10 shows an alternative embodiment of an ESDR System 400 using a single tank 402 for storing molten fluid. Molten fluid circulates through conduits 404 and 406 from tank 402 to electric heater system 408 and then back into tank 402. Heater system 408 draws electric power from transmission grid 412 via transmission line 414. The amount of electric current by heater system 408 is modulated responsive to grid information by control system 416. As shown, control system 416 receives grid signal 418 and uses that information to control heater system 408. The molten fluid also circulates through conduits 420 and 422 from tank 402 to heat exchanger 424 and then back into tank 402.

Power block 426 generally includes a steam turbine 428 and a generator 430. Conduits 432 and 434 fluidly couple turbine 428 to output heat exchanger 124. A working fluid is circulated in conduits 166 and 168. In use, a working fluid is heated in heat exchanger 124. Heat is supplied by the hot molten fluid supplied to heat exchanger 424 via conduit 420. The steam is heated to a much higher temperature and pressure via heat exchange with the molten fluid. The molten fluid cools as a result. The hot, pressurized steam drives turbine 428, causing a turbine shaft (not shown) to rotate. The rotation of the shaft allows generator 428 to generate electricity. The generator 428 is electrically coupled to substation 412 via transmission line 436. The generated electricity is supplied by generator 428 to substation 412 via transmission line 436. Meter 438 monitors the flow of electricity to substation 26.

Figure 11:
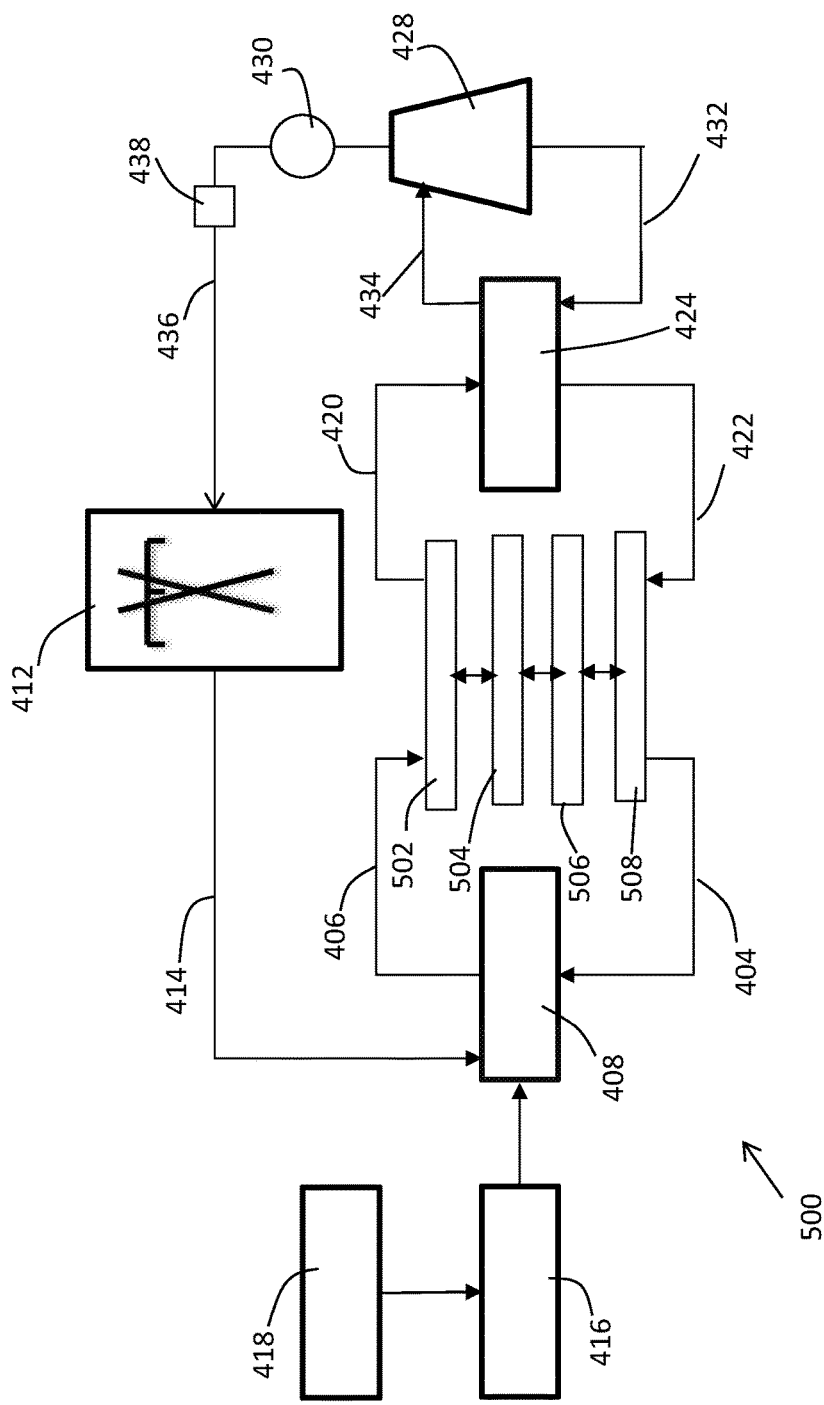
FIG. 11 is an alternative embodiment of an energy storage and supply system using a flex tank system for handling molten fluid.

In practice, the relative amounts of hot and cold molten fluid fluctuate as the fluid is charged with thermal energy and discharged. In order to reduce cost and/or footprint, it would be desirable to be able to customize the volume of the cold and hot tanks on demand to accommodate this variation. To achieve this objective, FIG. 11 shows how the ESDR system 400 of FIG. 10 can be modified for more flexibility in storing varying quantities of hot or cold molten fluid. ESDR system 500 is identical to ESDR system 400, and similar parts are numbered identically, except that single tank 402 is replaced with a plurality of tanks 502, 504, 506, and 508 that are connected in series. Tank 502 serves as a hot storage tank, while tank 508 serves as a cold storage tank. Intermediate tanks 504 and 506 are "flex" tanks in that either or both can be used for hot or cold storage on demand.

For example, when the system includes relatively equal amounts of cold and hot molten fluid, tanks 502 and 504 can be used for hot storage, while tanks 506 and 508 are used for cold storage. If the system is fully charged so that all or nearly all of the fluid is hot, tanks 502, 504, and 506 can be used for hot storage. Depending upon the volumes at issue, even tank 508 could be used for hot storage when the system is fully charged. If the system is fully discharged, the bottom three tanks 504-508 could be used for cold storage.

Figure 12:
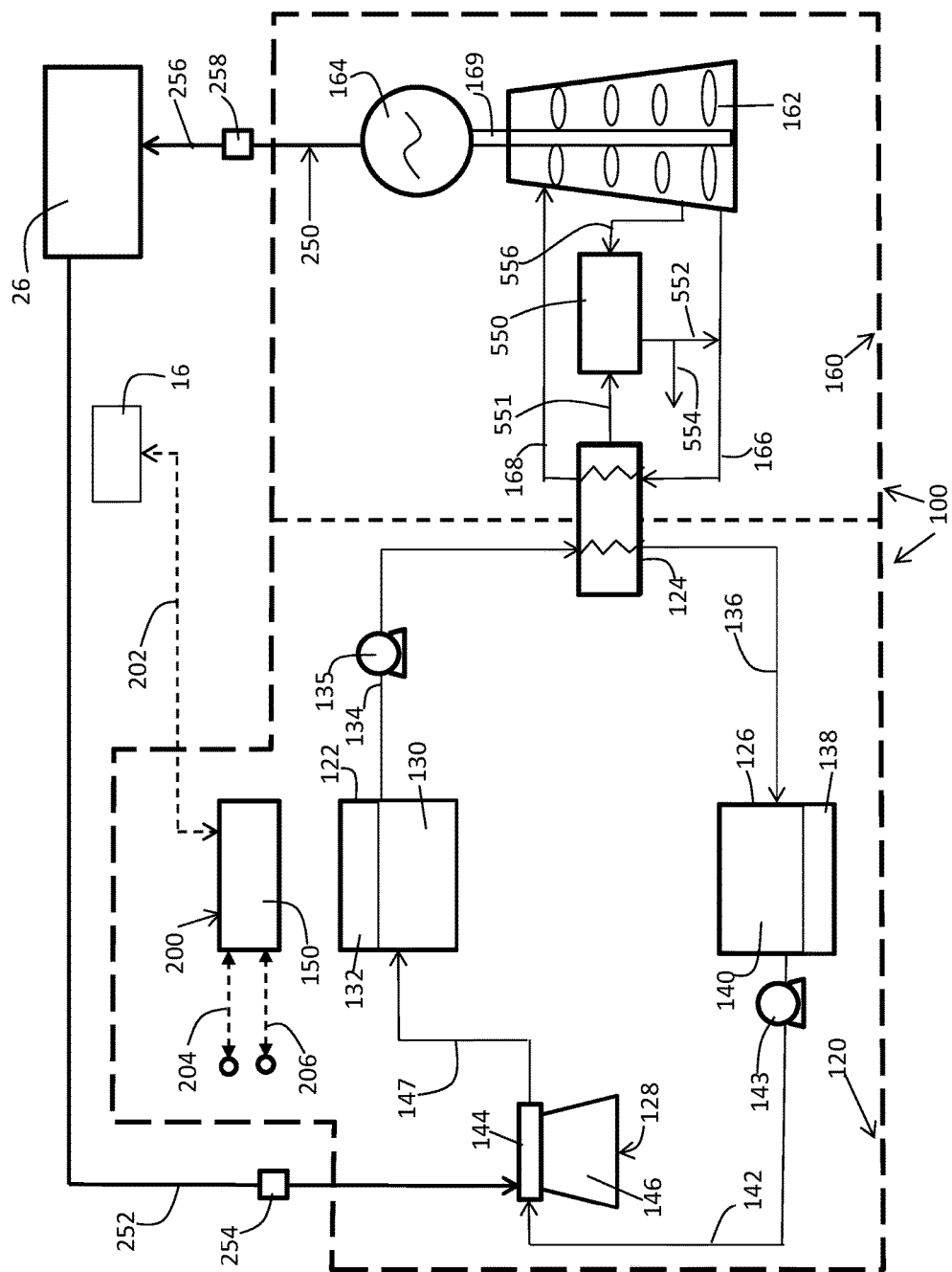
FIG. 12 is an alternative embodiment of the system of FIG. 2 further incorporating an additional heat function in the power block to provide heat for buildings.

In FIG. 2, the working fluid in the power block 160 is used to drive a turbine to generate electricity. The working fluid also can be used to provide heat for a wide variety of other purposes such as to provide heat in a building structure to make the interior more comfortable for occupants, to supply heat for an industrial process, to supply heat used to provide mechanical motion, and the like. FIG. 12 shows a modification of ESDR system 100 of FIG. 2 including such a modification. In FIG. 12, steam heat supply 550 is integrated into power block 160. A portion of the working fluid heated at heat exchanger 124 is diverted via conduit 551 to the steam heat supply 550 and used to provide building heat or the like. A portion of the working fluid output from the turbine also is diverted to steam heat supply 550 via conduit 556. After being used to provide heat, the cooled working fluid from heat supply 550 can be returned to the cycle via conduit 552 or discarded down drain 554.

All patents, patent applications, and publications cited herein are incorporated by reference in their respective entireties for all purposes. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A system for storing and supplying thermal energy, comprising:
   (a) a supply comprising a molten fluid;
   (b) a heating system that is thermally coupled to a flowing portion of the molten fluid in a manner effective to allow the heating system to heat the flowing portion of the molten fluid, wherein the heating system is electrically coupled to a source of electricity that supplies an electric current to the heating system, wherein the heating system draws and uses the electric current to generate heat used to heat the flowing portion of the molten fluid; and
   (c) a control system that uses information indicative of at least one condition of the source of electricity to (i)

controllably modulate the amount of electric current drawn and used by the heating system as a function of time to heat the flowing portion of the molten fluid to store energy from the source of electricity in the molten fluid, wherein the amount of electric current draw is increased and decreased as a function of time responsive to the information; and (ii) to controllably modulate the rate at which thermal energy stored in the molten fluid is discharged, wherein the rate of the discharge is modulated as a function of time responsive to the information.

2. The system of claim 1, wherein the source of electricity is a power system comprising a grid operator.

3. The system of claim 2, wherein the information used to modulate the storage or discharge thermal energy comprises grid information provided by a grid operator.

4. The system of claim 3, wherein the information comprises grid information relating to an energy demand of the power system, a grid frequency, an energy price, and/or a signal provided by the grid operator.

5. The system of claim 3, wherein the control system causes energy to be stored in the molten fluid as thermal energy when the grid information indicates that the electric power in the power system exceeds a demand for the electric power.

6. The system of claim 3, wherein the control system causes energy to be stored and delivered in and from the molten fluid to help absorb fluctuations in the amount of electricity being distributed by the electrical power system.

7. The system of claim 3, wherein the control system causes a flow rate of the molten fluid through the heater system and the electrical draw of the heater system to be modulated responsive to the grid information.

8. The system of claim 3, wherein the control system further gathers static and dynamic information of the system for storing and supplying thermal energy.

9. The system of claim 3, wherein the heater system comprises on and off modes, wherein the current draw is modulated responsive to the grid information while the heater system is in an on mode.

10. The system of claim 1, wherein the electric current is used by the heater at a voltage in the range from 480 volts to 40,000 volts.

11. The system of claim 1, wherein the control system causes the thermal energy to be discharged as electrical energy at a discharge rate in the range from zero to 20 megawatts.

12. The system of claim 1, further comprising a first molten fluid tank and a second molten fluid tank, wherein the first molten fluid tank holds a portion of the molten fluid at a temperature in the range from 400 C to 800 C.

13. The system of claim 1, further comprising a first molten fluid tank and a second molten fluid tank, wherein the second molten fluid tank holds a portion of the molten fluid at a temperature in the range from 230 C to 350 C.

14. The system of claim 1, wherein the heating system comprises an elevated heating vessels from which heated molten fluid drains by gravity into a molten fluid tank at a temperature in the range from 400 C to 800 C.

15. The system of claim 1, wherein the molten fluid comprises a molten salt.

16. The system of claim 1, wherein the molten fluid comprises a phase change material.

17. The system of claim 1, wherein the system further comprises a solar heating system that is thermally coupled to the molten fluid in a manner effective to store concentrated solar energy in the molten fluid as thermal energy.

18. The system of claim 1, further comprising a first molten fluid tank, an intermediate fluid tank, and a second molten fluid tank connected in series, wherein the first molten fluid tank stores a portion of the molten fluid that is relatively hot, wherein the second molten fluid tank stores an additional portion of the molten fluid that is relatively cold, and wherein the intermediate tank can be used to store relatively hot or relatively cold molten fluid on demand.

19. The system of claim 1, further comprising a working fluid thermally coupled to the molten fluid in a manner effective to transfer heat energy from the molten fluid to the working fluid.

20. A method of storing thermal energy, comprising the steps of:
(a) providing a system for storing thermal energy according to claim 1;
(b) receiving signal communications provided by an operator of the electricity source;
(c) using the signal communications to modulate electricity used by the heating system to heat the flowing portion of the molten fluid; and
(d) using the signal communications to modulate the flow rate of the flowing portion of the molten fluid.

21. The method of claim 20, further comprising the steps of using the molten fluid to heat a working fluid, and using the heated working fluid to generate electricity.

22. A power system, comprising:
(a) an energy storage and supply system that stores and supplies electrical energy on demand, comprising:
(i) a supply comprising a molten fluid;
(ii) a heating system that is fluidly coupled to the flowing portion of the molten fluid in a manner effective to allow the heating system to heat the flowing portion of the molten fluid to a temperature in the range from 500 C to about 800 C, wherein the heating system is electrically coupled to a source of electricity supplied at a voltage in the range from about 480 volts to about 200 kV;
(iii) a control system that uses information indicative of at least one condition of the source of electricity to (i) controllably modulate the amount of electric current drawn and used by the heating system as a function of time to heat the flowing portion of the molten fluid to store energy from the source of electricity in the molten fluid, wherein the amount of electric current draw is increased and decreased as a function of time responsive to the information; and (ii) to controllably modulate the rate at which thermal energy stored in the molten fluid is discharged, wherein the rate of the discharge is modulated as a function of time responsive to the information; and
(iii) a working fluid thermally coupled to the molten fluid in a manner effective to transfer heat energy from the molten fluid to the working fluid
(b) an additional power supply entity that supplies electrical energy;
(c) a grid operator;
(d) a plurality of end users; and
(e) a distribution network that distributes electrical energy from the energy storage and supply system and the additional power supply entity to the end users.

23. The power system of claim 22, wherein the energy storage and supply system is incorporated into an existing power generation facility.

* * * * *